No. 631,293. Patented Aug. 22, 1899.
J. M. GARDNER.
ROLL BOX ADJUSTING MECHANISM FOR COTTON SEED LINTERS AND GINS.
(Application filed May 13, 1897.)

(No Model.) 2 Sheets—Sheet 1.

Witnesses:
Albert Spidel
Relle Ewett

Inventor:
J. M. Gardner,
by R. S. Dyrenforth
his attorney.

THE NORRIS PETERS CO., PHOTO-LITHO., WASHINGTON, D. C.

No. 631,293. Patented Aug. 22, 1899.
J. M. GARDNER.
ROLL BOX ADJUSTING MECHANISM FOR COTTON SEED LINTERS AND GINS.
(Application filed May 13, 1897.)
(No Model.) 2 Sheets—Sheet 2.
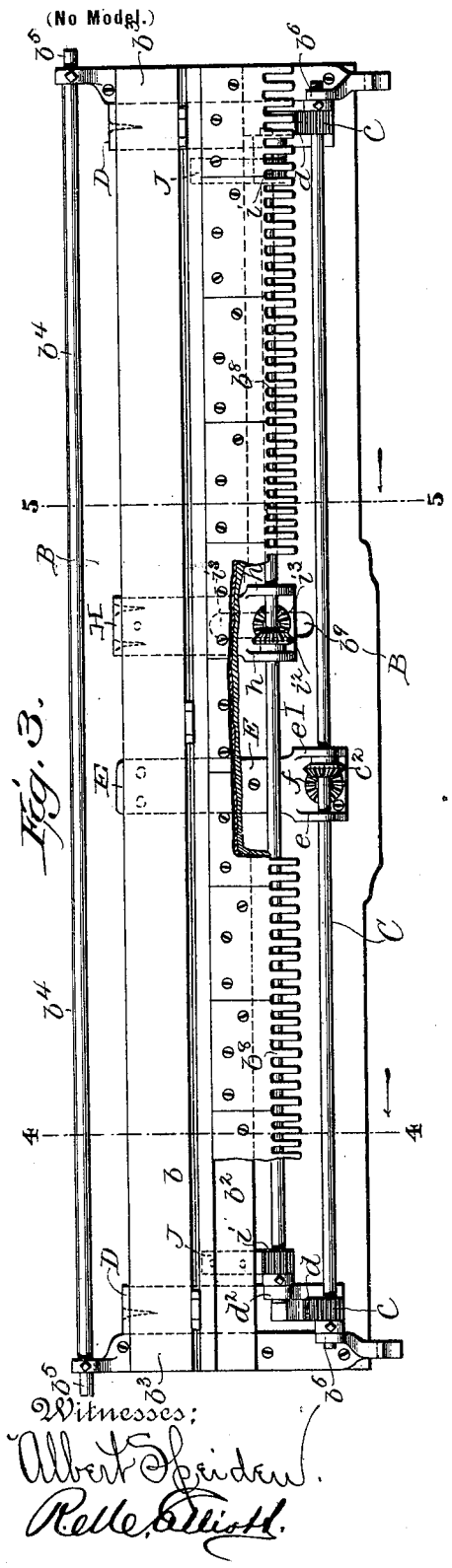
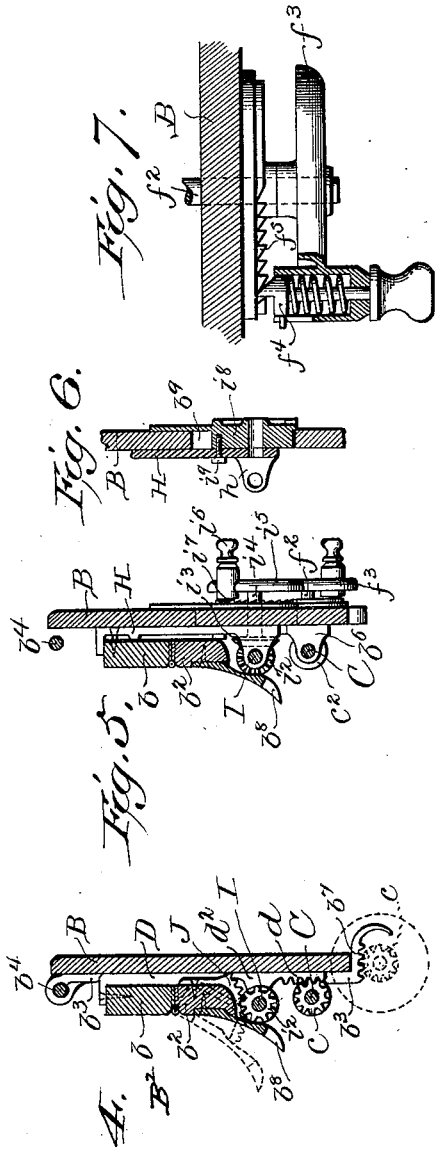
Inventor:
J. M. Gardner,
by R. S. Dyrenforth,
his attorney.

UNITED STATES PATENT OFFICE.

JEFFERSON M. GARDNER, OF NEW LONDON, CONNECTICUT.

ROLL-BOX-ADJUSTING MECHANISM FOR COTTON-SEED LINTERS AND GINS.

SPECIFICATION forming part of Letters Patent No. 631,293, dated August 22, 1899.

Application filed May 13, 1897. Serial No. 636,379. (No model.)

*To all whom it may concern:*

Be it known that I, JEFFERSON M. GARDNER, a citizen of the United States, residing at New London, in the county of New London and State of Connecticut, have invented certain new and useful Improvements in Roll-Box-Adjusting Mechanism for Cotton-Seed Linters and Gins; and I do hereby declare the following to be a full, clear, and exact description of the invention, such as will enable others skilled in the art to which it appertains to make and use the same.

This invention relates to roll-box-adjusting mechanism for cotton-seed linters and gins.

The object is to provide mechanism by which the adjustment of a seed roll-box of a cotton-seed linter and cotton-gin can be quickly and easily effected to suit any quality or condition of cotton-seed or seed-cotton being operated upon; furthermore, to provide mechanism by which the shape of the mass of cotton-seed or seed-cotton being operated upon can be so changed as to effect the best results by increasing the quantity and improving the quality of the lint produced; furthermore, to provide a cotton-seed roll-box that can be readily changed from an oblong to a true circle, thereby rendering the apparatus capable of linting very damp seed or ginning seed cotton, and finally to provide a cotton-seed roll-box having great range of adjustment, whereby an operator can correctly and quickly adjust the machine to do the work required.

With these objects in view the invention consists in the novel construction and combination of parts of a roll-box-adjusting mechanism for cotton-seed linters and cotton-gins, as will be hereinafter fully described and claimed.

In the accompanying drawings, forming a part of this specification and in which like letters of reference indicate corresponding parts, I have illustrated a form of embodiment of my invention, although it is to be understood that other forms of embodiment thereof may be employed without departing from the spirit of the same.

Figure 1:
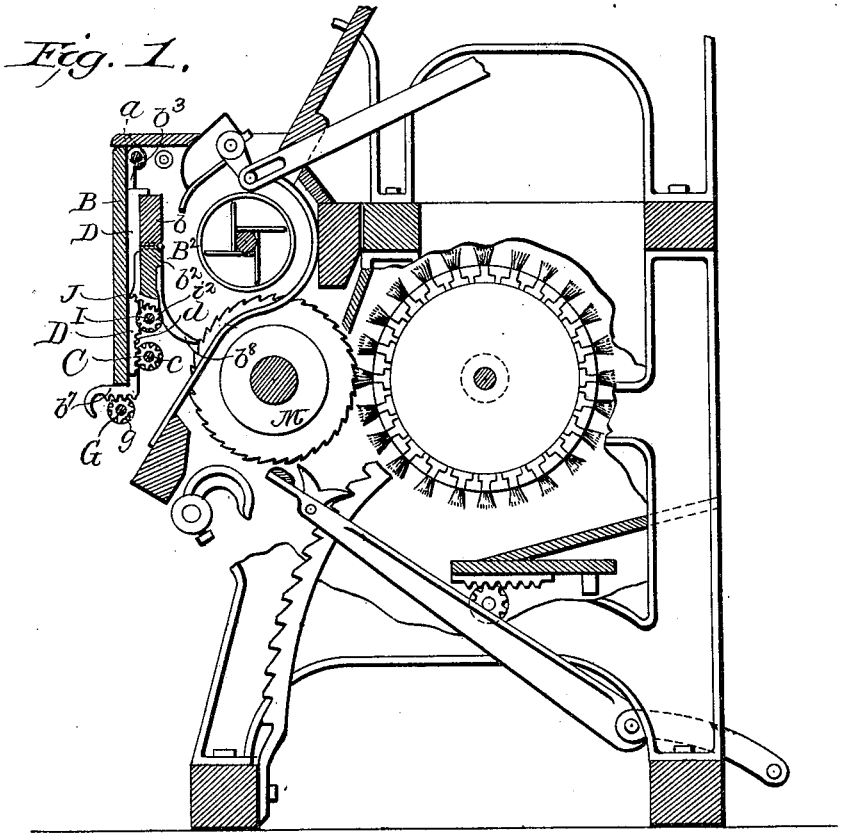
Figure 2:
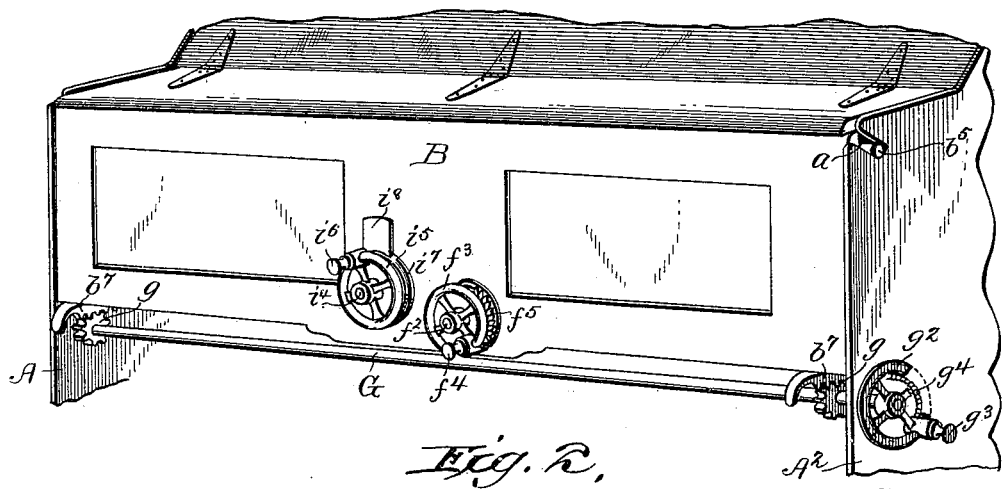

In the drawings, Figure 1 is a view in sectional elevation of the lower portion of a cotton-seed linter, showing my improvements applied thereto. Fig. 2 is a view in perspective of the roll-box detached from the machine. Fig. 3 is a view in rear elevation, partly in section, of the roll-box front removed from the roll-box, showing the mechanism carried by said front. Fig. 4 is a view in vertical section taken on the line 4 4, Fig. 3, looking in the direction of the arrow. Fig. 5 is a view similar to Fig. 4, taken on the line 5 5, Fig. 3, looking in the direction of the arrow. Fig. 6 is a sectional detail view showing the connection between certain parts of the mechanism of the roll-box front; and Fig. 7 is a detached sectional detail view in plan, on an enlarged scale, of one of the hand-wheels employed for operating certain parts of the device.

Referring to the drawings, A and $A^2$ designate, respectively, the right and left hand roll-box heads, to be constructed of a suitable material, such as cast-iron or the like, and to serve also as supports for the roll-box front.

The roll-box front is made detachable from the heads, and comprises a panel or front proper, B, and a finger-board $B^2$, composed of an upper and lower member $b$ $b^2$, respectively, the latter carrying the finger-sections, the function of which will appear later on. The front has secured to it at each end a hanger $b^3$, the upper portion of each hanger being provided with an opening, through which extends a rod $b^4$, the ends of which project beyond the front B to present pintles $b^5$, designed to engage with inclined slots $a$, formed in the upper outer portion of the roll-box heads. This arrangement allows the bottom of the front to have a swinging movement and also to be removed when desired to permit access to the interior of the machine.

The lower portion of each hanger $b^3$ is provided with a perforated ear or projection $b^6$, and through the two ears thus formed is passed a shaft C, which extends entirely across the front of the apparatus and carries at each end a gear $c$, adapted to engage with the teeth of a rack-plate $d$ on each of a pair of hangers D, secured to the upper section $b$ of the finger-board.

The shaft C is mounted near its center in ears or bearings $e$, carried by a hanger E, secured to the back of the roll-box front B, as clearly shown in Fig. 3, and on this shaft is mounted a miter-gear $c^2$, designed to mesh with a similar gear $f$, carried by a stud $f^2$, mounted in the hanger. The outer end of the stud $f^2$ carries a hand-wheel $f^3$, provided with a spring-pressed latch $f^4$, Fig. 6, adapted to engage with the teeth of a circular rack-plate $f^5$, secured to the front of the roll-box, back of the hand-wheel. The function of this hand-wheel is through the agency of the miter-gears $f$ and $c^2$, to impart rotary motion to the shaft C, and thereby cause the gears $c$ to reciprocate the hangers D vertically to raise or lower the members $b$ $b^2$ of the finger-board, and thus to move the fingers hereinafter to be described to or from the saws to make either a circular or an oblong roll-box. When it is desired to make a circular roll-box, the hand-wheel $f^3$ will be turned to the right, this being necessary only when it is proposed to lint very damp cotton-seed or seed-cotton or to start up the linter after it has been standing and the interior of the roll-box has become rough and rusted.

Arranged below the shaft C and parallel therewith is a shaft G, having its ends journaled in suitable bearings in the heads A $A^2$, and on each end of this shaft G is mounted a pinion $g$, adapted to engage with rack-plates $b^7$, carried by the lower portion of each hanger $b^3$, as clearly shown in Fig. 2, and secured to one end of this shaft G is a hand-wheel $g^2$, carrying a latch $g^3$ to engage with a circular rack-plate $g^4$, secured in this instance to the outer face of the head $A^2$. The object of this hand-wheel $g^2$ is to rotate the shaft G and cause its gears $g$ by engagement with the racks $b^7$ to move the lower portion of the roll-box front in and out to increase or diminish the discharge of seed, as will be obvious by reference to Fig. 1.

To the upper member of the finger-board is secured a hanger H, provided with ears $h$, and through these ears passes a shaft I, having its ends journaled in perforated lugs or bearings $d^2$, carried by the hangers D. This shaft I carries at each end a pinion $i$, designed to engage with rack-plates J, secured to the back of the lower member $b^2$ of the finger-board and extending at right angles to the plane of the roll-box front, the said member carrying the fingers $b^8$, as shown in Fig. 3, the fingers being curved outward beyond the member, so as readily to enter between the saws without interference with the member. The shaft I has mounted upon it, between the ears $h$ of the hanger H, a miter-gear $i^2$, designed to engage with a similar gear $i^3$, carried by a stud $i^4$, Fig. 5, and secured to this stud $i^4$ is a hand-wheel $i^5$, provided with a latch $i^6$, such as described in connection with the hand-wheel $f^3$, the latch $i^6$ engaging a circular rack-plate $i^7$, arranged on the outer side of the roll-box front and back of the hand-wheel. The function of the hand-wheel $i^5$ is to move the lower member of the finger-board to or from the saws to increase or diminish the seed discharge, as by turning the hand-wheel to the left the fingers $b^8$ will be moved astride the saws M to decrease the discharge of seed, and by turning the hand-wheel in the opposite direction the fingers will be moved away from the saws and thereby increase the discharge of seed.

The front is provided with an opening $b^9$, in which the body portion $i^8$, Fig. 6, of the rack-plate $i^7$ works to permit the said rack-plate to be moved up and down, together with the finger-board, the rack-plate being held assembled with the hanger H by bolts $i^9$ (one only being shown in Fig. 6) extending through the hanger H and into the back of the body of the rack-plate.

It will be seen from the description that this adjusting mechanism is exceedingly simple in construction, will be found highly efficient in use, and will accomplish with readiness and ease the objects for which it is designed.

Having thus fully described my invention, what I claim as new, and desire to secure by Letters Patent of the United States, is—

1. In a cotton-seed linter and cotton-gin, the combination with the seed roll-box and saws, of a roll-box front movably supported in front of the said parts, means for imparting lateral movement to the said front independently of the roll-box, a two-membered finger-board supported by the front, and means for imparting an up-and-down movement to the finger-board, independently of the front, substantially as described.

2. In a cotton-seed linter and cotton-gin, the combination with the roll-box front, of a finger-board consisting of two members hinged together, brackets carried by the front, two shafts working in the brackets, and carrying pinions, rack-plates carried by the front and the finger-board, respectively, and engaging with the pinions, and means for rotating one of the shafts, whereby to impart an up-and-down motion to the finger-board, and means for rotating the other shaft whereby to impart an in-and-out motion to the finger-board, and a third shaft with means for rotating the same to impart a swinging motion to the roll-box front, substantially as described.

In testimony whereof I affix my signature in presence of two witnesses.

JEFFERSON M. GARDNER.

Witnesses:
L. LISTER WATROUS,
GEORGE T. BROWN.